US008822886B2

(12) United States Patent
Lehman et al.

(10) Patent No.: US 8,822,886 B2
(45) Date of Patent: *Sep. 2, 2014

(54) FOOD PRODUCT HEATING DEVICE WITH FOOD HEATING SLOT BETWEEN HEATING ELEMENTS

(71) Applicants: Lon Lehman, Ft. Wayne, IN (US); Eugene Tippmann, Jr., Ft. Wayne, IN (US)

(72) Inventors: Lon Lehman, Ft. Wayne, IN (US); Eugene Tippmann, Jr., Ft. Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,644

(22) Filed: Feb. 1, 2013

(65) Prior Publication Data

US 2013/0167736 A1    Jul. 4, 2013

Related U.S. Application Data

(63) Continuation of application No. 12/618,287, filed on Nov. 13, 2009, now Pat. No. 8,367,977.

(60) Provisional application No. 61/114,150, filed on Nov. 13, 2008.

(51) Int. Cl.
   *F24C 7/10*   (2006.01)

(52) U.S. Cl.
   USPC .................................. 219/386; 99/389

(58) Field of Classification Search
   USPC ................. 219/401, 391, 386; 99/389
   See application file for complete search history.

(56) References Cited

U.S. PATENT DOCUMENTS

| 4,066,862 A | 1/1978 | Tippmann |
|---|---|---|
| 4,149,840 A | 4/1979 | Tippmann |
| 4,299,060 A | 11/1981 | Tippmann |
| 4,547,995 A | 10/1985 | Tippmann |
| 4,767,581 A | 8/1988 | Tippmann |
| 4,864,788 A | 9/1989 | Tippmann |
| 5,004,617 A | 4/1991 | Bowen et al. |
| 5,086,693 A | 2/1992 | Tippmann |
| 5,201,364 A | 4/1993 | Tippmann |
| 5,235,903 A | 8/1993 | Tippmann |
| 5,318,792 A | 6/1994 | Tippmann |
| 5,411,753 A | 5/1995 | Tippmann |

(Continued)

FOREIGN PATENT DOCUMENTS

| JP | 07-289444 A | 11/1995 |
|---|---|---|
| JP | 7289444 A | 11/1995 |

(Continued)

OTHER PUBLICATIONS

B. Goo; International Search Report; PCT/US09/64388; Jun. 25, 2010.

(Continued)

*Primary Examiner* — Julio J Maldonado
*Assistant Examiner* — Robert Bachner
(74) *Attorney, Agent, or Firm* — Studebaker & Brackett PC (57) ABSTRACT

A compact portable heating device adapted to heat multiple food products simultaneously is provided. The heating device includes at least one heating element positioned opposite at least one other heating element to form a slot between heating surfaces of the elements for receiving food product. One heating element is mounted to move linearly along a longitudinal axis substantially perpendicular to the heating surfaces. Preferably, a first set of movable heating elements are meshed with a second set of heating elements to form an alternating arrangement. One or more heat generators, e.g. steam generators, are positioned to provide heat while minimizing the size of the device.

16 Claims, 9 Drawing Sheets

(56) References Cited

U.S. PATENT DOCUMENTS

| | | |
|---|---|---|
| 5,662,959 A | 9/1997 | Tippmann |
| 5,680,810 A | 10/1997 | Sham |
| 5,767,487 A | 6/1998 | Tippmann |
| 5,921,172 A | 7/1999 | Kiczko et al. |
| 5,939,125 A | 8/1999 | Tippmann |
| 5,960,869 A | 10/1999 | Tippmann |
| 5,993,878 A | 11/1999 | Tippmann |
| 6,062,129 A | 5/2000 | Tippmann |
| 6,103,289 A | 8/2000 | Tippmann |
| 6,145,431 A | 11/2000 | Tippmann |
| 6,152,024 A | 11/2000 | Tippmann |
| 6,263,963 B1 | 7/2001 | Tippmann |
| 6,539,839 B1 | 4/2003 | Tippmann |
| 6,639,187 B2 | 10/2003 | Arel et al. |
| 6,753,025 B1 | 6/2004 | Tippmann |
| 7,348,519 B2 | 3/2008 | Federspiel |
| 7,538,300 B1 | 5/2009 | Tippmann, Jr. |
| 7,677,160 B2 | 3/2010 | Tippmann, Sr. |
| 2005/0109218 A1 | 5/2005 | Arnedo et al. |
| 2005/0204927 A1 | 9/2005 | Boyle et al. |

FOREIGN PATENT DOCUMENTS

| | | |
|---|---|---|
| JP | 2004-209161 A | 7/2004 |
| KR | 10-064682 B1 | 12/2002 |
| KR | 10-0364682 B1 | 12/2002 |

OTHER PUBLICATIONS

B. Goo; Written Opinion of the International Searching Authority; PCT/US09/64388; Jun. 25, 2010.

FOOD PRODUCT HEATING DEVICE WITH FOOD HEATING SLOT BETWEEN HEATING ELEMENTS

TECHNICAL FIELD

This invention relates to a heating device, and specifically, to a simple, compact heating device for simultaneously heating both sides of one or more food products.

BACKGROUND OF THE INVENTION

In the food preparation and service industries, there is an ongoing need for more efficient and effective food preparation. Restaurants, hotels, and kitchens in a variety of establishments, are often required to properly heat and/or cook many food products in a short amount of time using a limited amount of resources, such as kitchen space and staff. Improvements are desirable.

BRIEF DESCRIPTION OF THE DRAWINGS

FIG. 9b is an end view of the product door of FIG. 9a; and

DETAILED DESCRIPTION OF THE INVENTION

Figure 10:
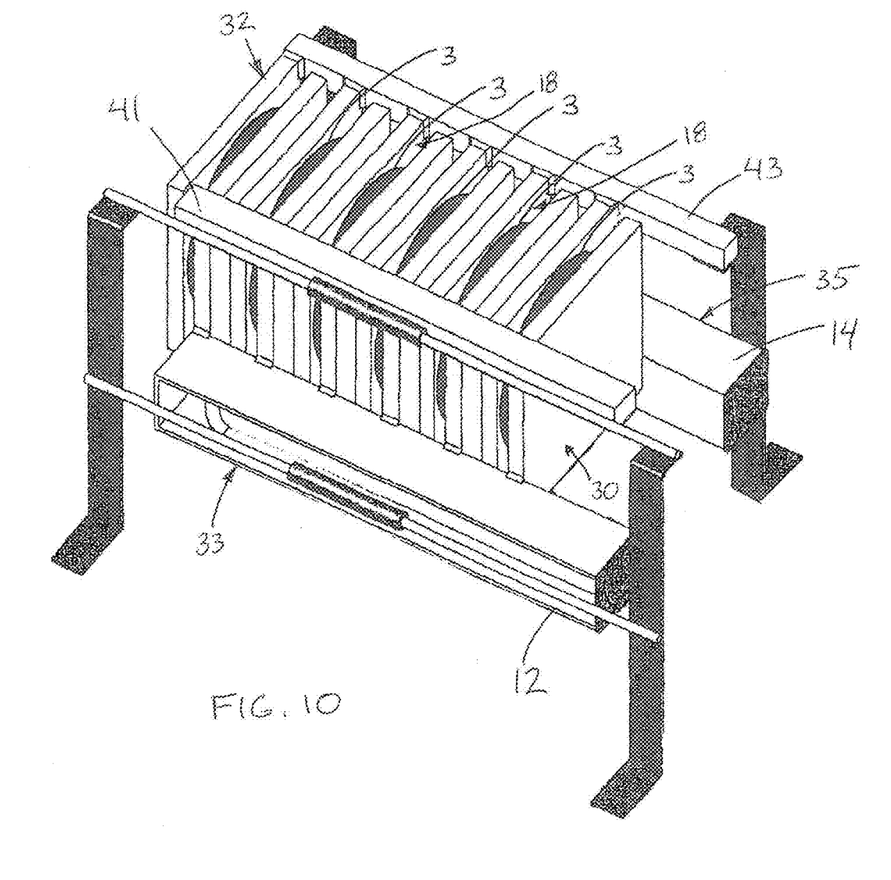
FIG. 10 is a conceptual perspective view of an exemplary embodiment of the device of the present invention.

Referring to FIGS. 1-6, an exemplary embodiment of the food product heating device of the present invention, indicated generally at 10, includes one or more heat generators 12, 14, multiple (two or more) heating elements 16 positioned adjacent one another to create at least one heating slot 18 for receiving a food product 3 (FIG. 10), a movable product door 22 for supporting and controlling the position of the food product, and a housing 24. The simple, compact device 10 effectively and efficiently heats and/or cooks multiple food products, such hamburgers, chicken cutlets, fish patties, vegetable burgers, or any other food product capable of being positioned in slot 18 by simultaneously applying heat to both sides of each food product. Heating device 10 is especially effective in heating and/or cooking raw food products, whether frozen or not, and food products that have been previously cooked and require reheating. Heating device 10 is a small, compact, and portable unit that effectively uses vertical space thereby occupying a minimum amount of horizontal space, e.g. counter area, and maximizing the ratio of food product heated per square foot of horizontal space occupied by the device. Therefore, device 10 can be conveniently moved and positioned in desired locations in an environment where space is limited.

As used herein, the terms heat, heated, and heating should be understood to include the application of heat to the food product by heating elements 16 regardless of the degree of heat transferred or the effect on the food product. Therefore, heating includes applying heat to a food product using heating elements 16 so as to raise the temperature of, cook, thaw, warm, and/or sear the food product or products.

As shown in the FIGS. 1 and 3-5, in an exemplary embodiment, multiple heating elements 16 may include a first set or array of heating elements 30 and a second set or array of heating elements 32. First set and second set of heating elements 30, 32, respectively, may be connected, e.g. mounted on or formed integral with, a first and a second heat generator 12, 14, respectively, for example, at one lower corner of heating elements 30, 32 to form a first heating assembly 33 and a second heating assembly 35, respectively. In this manner, each heat generator provides physical support to the respective set of heating elements. First heating assembly 33, comprising first set of heating elements 30 and first heat generator 12, is movably mounted for sliding movement along longitudinal axis 2 of device 10 on linear bearings 34 mounted inside housing 24. The second heating assembly 35, comprising second set of heating elements 32 and second heat generator 14, is stationary and fixedly mounted to housing 24. Housing 24 may include a rear section 25, side sections 27, a lower base 29, legs 31, and grease walls 45.

First set of heating elements 30 are meshed with second set of heating elements 32 so as to overlap and alternate along the longitudinal axis 2 (FIGS. 3, 4, and 10) of the device to form pairs of heating elements where each pair forms a heating slot 18 and includes one heating element from first set of heating elements 30 and one heating element from second set of heating elements 32. Once food product is loaded or inserted into slots 18, first heat assembly 33 is moved or shifted linearly and axially along the longitudinal axis 2 causing first set of heating elements 30 to move closer to second set of heating elements 32 to contact the food product and enable heating. Preferably both opposing heating elements defining a particular heating slot contact respective sides of the food product to optimize heating. Of course a single slot 18 may receive more than one food product, such as two or more hot dogs.

Each heating element 16 of the first and second set of heating elements 30, 32, may include a platen or plate 36 and a back portion 38 connected to or formed on plate 36 to create an inner chamber 40. The chambers 40 may be capable of withstanding a maximum internal pressure of, for example, 250 psi. Preferably, each plate 36 includes a generally flat or planar heating surface 47 so that the opposing flat heating surfaces of adjacent plates 36 are positioned adjacent and generally parallel to one another to partially form slots 18. Of course, the heating surfaces may have a predetermined shape, such as a slightly concave shape or be provided with formations, such as ridges or grooves. The plates 36 are spaced in the loading position to form slots 18 of a sufficient size (width) to receive a food product of a particular size between heating elements 16 for heating on both sides of the food product simultaneously by direct contact with opposite plates 36. Back portions 38 may be connected to respective plates 36 by welding. Each plate 36 and back portion 38, and thus inner chamber 40, includes an extension section, indicated generally at 39, with a connection chamber 49 positioned at one corner and extending to fluidly connect with respective heat generators 12, 14. The extension section 39 extends through, and is connected to, the respective grease wall 45. The grease wall 45, on the side of the device having the first heating assembly 33, therefore moves with the first heating assembly. Preferably, the connection surrounding each extension 39 and the respective grease wall 45 is sealed to prevent grease and fluids from reaching the heat generators.

Each heating element 16 is positioned so that the opposing heating surfaces 47 extend transverse to, i.e. greater than 45 degrees from, the horizontal support surface supporting the device, i.e. the surface on which legs 31 are positioned. Preferably, heating surfaces 47 are positioned substantially vertical, that is, vertical or at an angle of less than 45 degrees from a vertical plane, regardless of the angle of the support surface, so that slots 18 are also positioned substantially vertical, and in series along the longitudinal axis 2 of device 10. As a result, slots 18, and heating surfaces 47, are positioned substantially perpendicular to the longitudinal axis 2 of device 10, and any generally flat surface on which the device 10 is supported.

Figure 6:
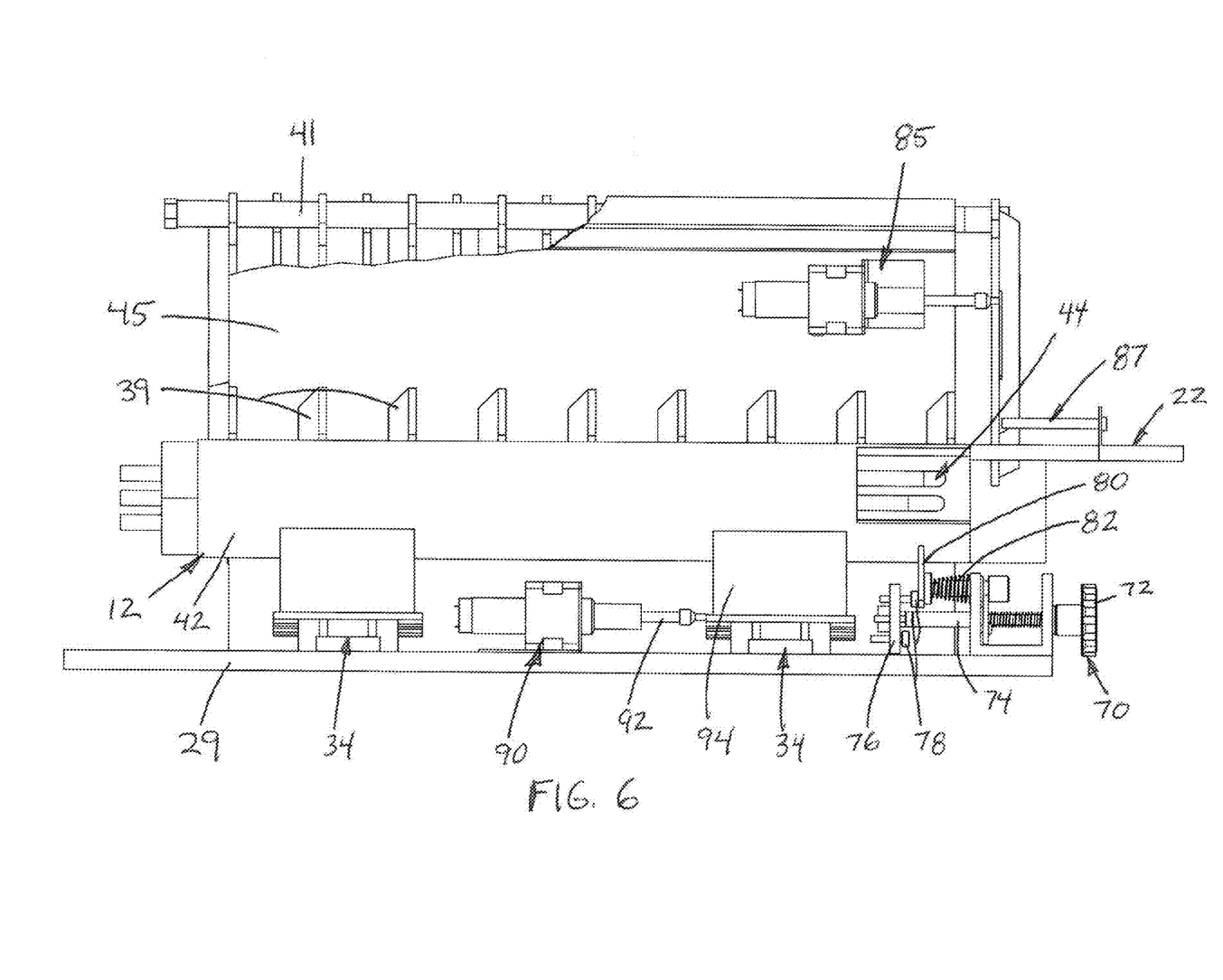
FIG. 6 is a side view of the device of FIG. 5.

The width of slots 18 can be adjusted to accommodate different sized food product using an adjustment mechanism 70 to permit selective adjustment of the extent of the linear movement of first heating assembly 33 to the left in FIG. 6 to define the position of the assembly along the longitudinal axis when in the heating position thereby defining the width of each heating slot 18. In the exemplary embodiment, adjustment stop mechanism 70 includes a knob 72, a rotatable shaft 74 connected to the knob at one end, and a stop wheel 76 connected to an opposite end of shaft 74. Stop wheel 76 includes a plurality of stops or protrusions 78 extending axially from, and positioned annularly around, one side of stop wheel 76 for contact by a bracket 80 fixedly attached to movable first heating assembly 33. Each of protrusions 78 extend from stop wheel 76 a different distance to create a different axial ending position of the first heating assembly 33 in the heating position. A user simply rotates knob 72 to a present position to create a particular stop position corresponding to a desired heating slot width. A bias spring 82 is mounted between a portion of housing 24 and bracket 80 to bias bracket 80 and thus first heating assembly 33 toward the heating position as limited by an aligned protrusion 78. Of course, adjustment stop mechanism 70 may be any manual or automated device including mechanical and/or electronic device capable of providing a limit to the axial position of the assembly 33. For example, in an alternative embodiment, adjustment stop mechanism 70 may include sensors for sensing the size of the food product and an automated adjustment system to adjust the position of plates 36 and/or assembly 33 to obtain the desired heating slot width.

Figure 7:
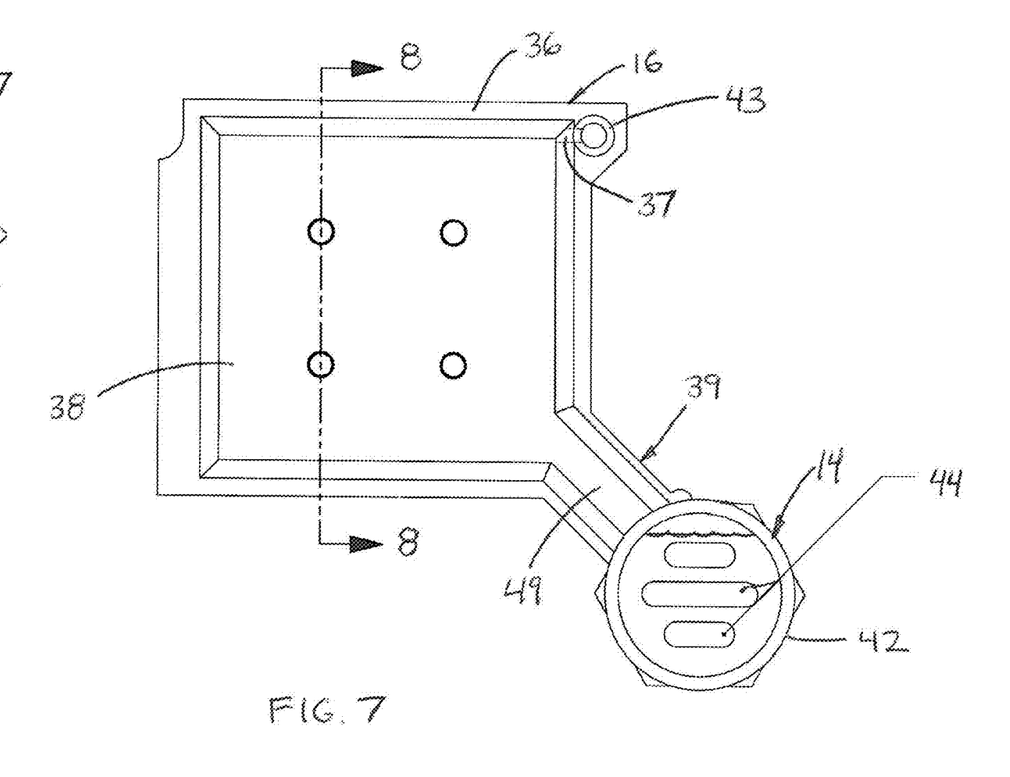
FIG. 7 is an end view of one heating element connected to a steam generator.
Figure 8:
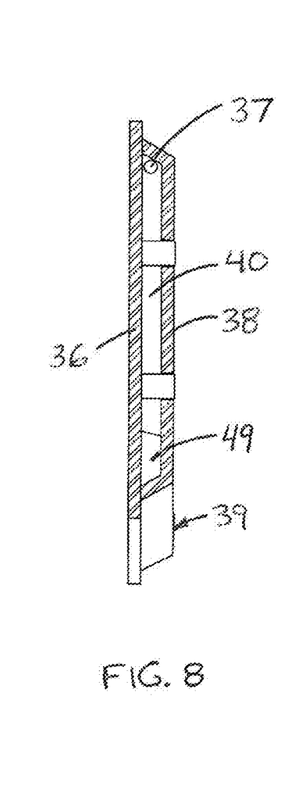
FIG. 8 is a cross-sectional view of the heating element taken along plane 8-8 in FIG. 7.

First and second support manifolds 41, 43 extend along the top of a respective set of plates 36 associated with first and second heating elements 30, 32, respectively. Manifolds 41, 43 are hollow tubes that connect the chambers 40 of the respective set of heating elements associated with the respective heating assemblies 33, 35. As shown in FIG. 7, the steam from one chamber is fluidly connected to the respective manifold via a branch passage 37 and thus connected to all other chambers of the heating elements in the respective first or second set of heating elements. Since the manifolds are positioned at or near a high point in the system, each manifold 41, 43 includes a removable end cap that can be used to bleed air from the system and to add condensate to the system. Thus all chambers 40 of first set of heating elements 30 are commonly connected to both heat generator 12 and manifold 41 and also interconnected to one another via manifold 41 via branch passages 37, while all chambers 40 of second set of heating elements 30 are commonly connected to heat generator 14 and manifold 43 and also interconnected via manifold 43 and respective branch passages 37.

Each heat generator 12, 14 may be preferably a steam generator capable of containing a condensate/liquid, such as water, and generating steam. Each heat generator 12, 14 may include a condensate housing or manifold 42 and a heater 44, such as an electric heater, positioned inside condensate housing 42 for heating the condensate. Steam generated in each housing 42 flows upwardly into the various respective chambers 40 of the respective set of heating elements 30, 32, thereby providing heat to plates 36. The steam provides heat to plates 36 and the food product, causing the steam to condense to a liquid which then drains back to housing 42. Thus in the present exemplary embodiment, the mounting of heat generators 12, 14 on housing 24 creates an integral, self-contained unit with a closed steam system, needing only a source of electricity. In another exemplary, although less preferred, embodiment, one or more heat generators may be external to the device and, for example, steam provided to chambers 40 by external piping connected to a respective manifold mounted in place of heat generators 12, 14.

Figure 1:
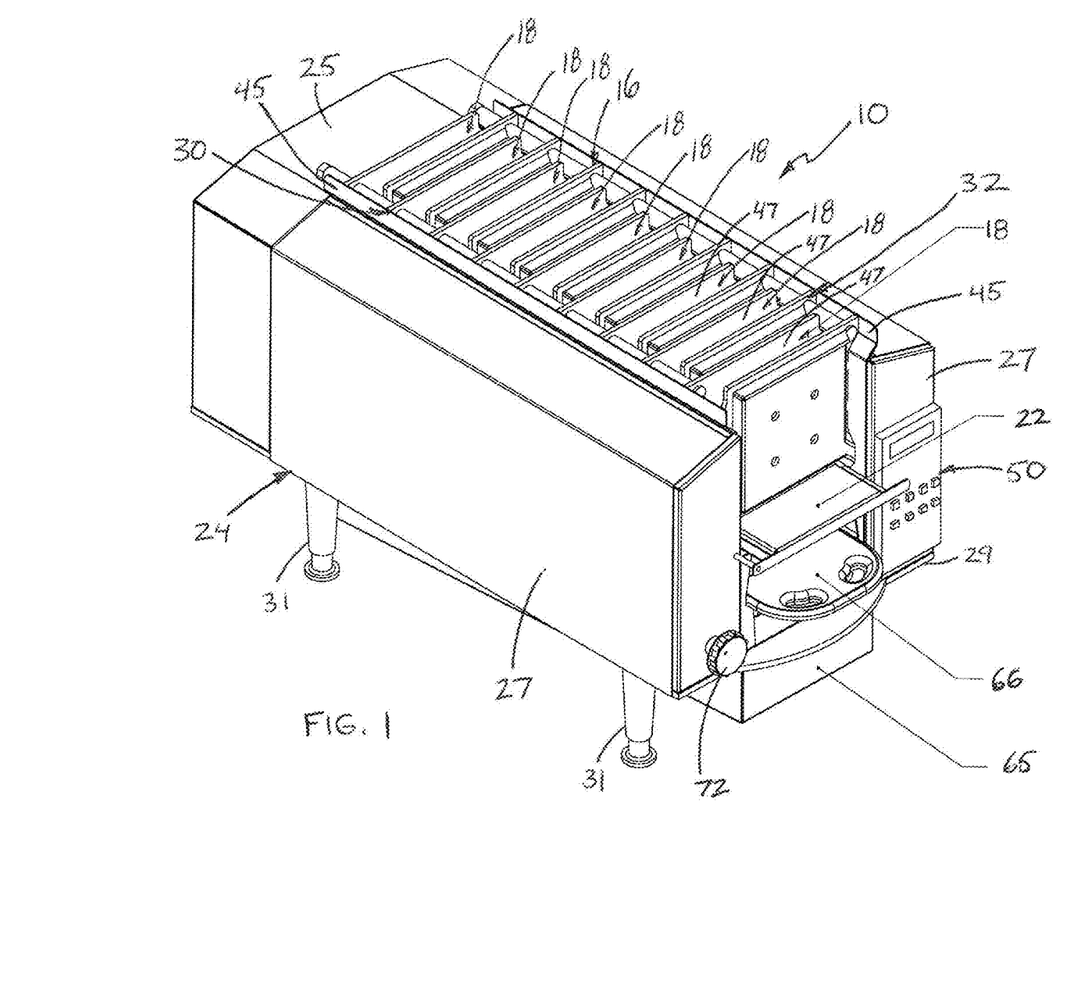
FIG. 1 is a perspective view of an exemplary embodiment of the heating device of the present invention.
Figure 2:
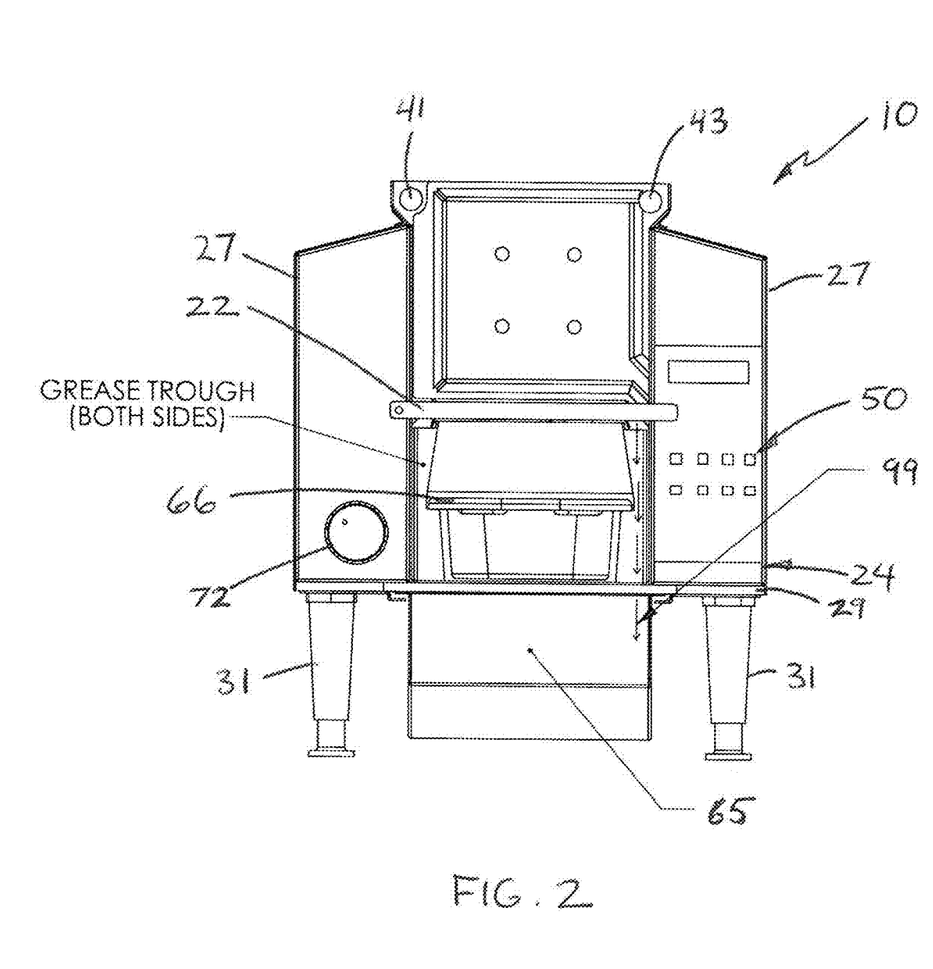
FIG. 2 is a front end view of the device of FIG. 1.
Figure 9A:
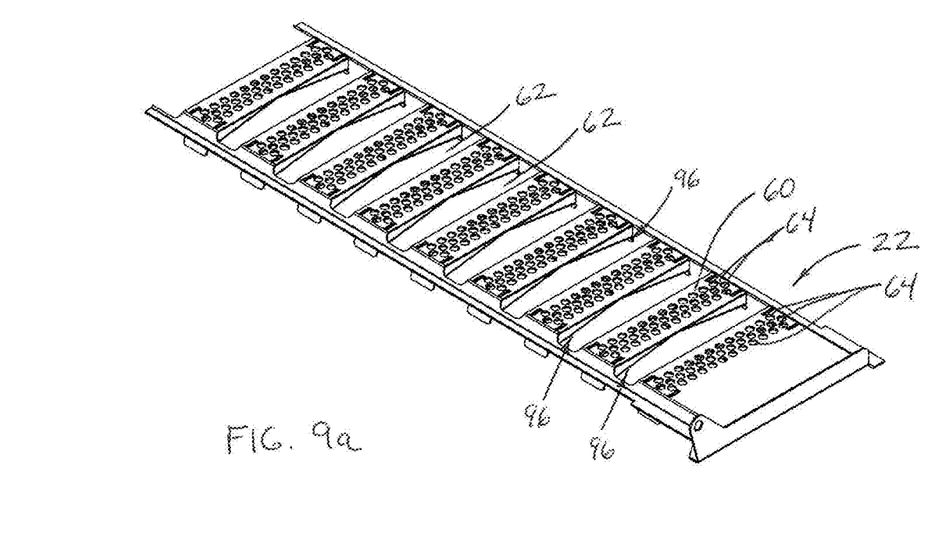
FIG. 9a is a perspective view of the product door of the heating device of FIG. 5.
Figure 9B:
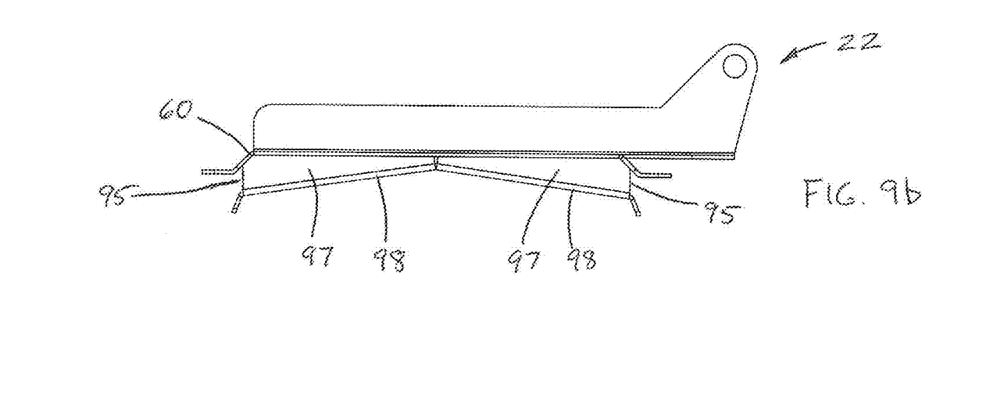

Heating device 10 may also include a product door 22 slidably mounted on housing 24 below first and second heating elements 30, 32 for shifting/sliding movement between a support position shown in FIG. 3 and a drop position shown in FIG. 4. Referring to FIGS. 9a and 9b, product door 22 includes a top surface 60 and a series of elongated exit openings 62 intermittently spaced along the longitudinal extend of door 22 and extending through top surface 60 for allowing food product to fall from slots 18. Product door 22 also includes a series of drain holes 64 extending through top surface 60 and positioned in alternating fashion with exit openings 62 along the longitudinal axis of device 10 for permitting fluid run-off, such as grease, from the food product to flow from the slots 18 to a grease pan 65 (FIGS. 1 and 2). Product door 22 also includes a series of grease baffles 96 positioned under the drain holes 64 and between exit openings 62. Each grease baffle 96 includes side walls 97, and a bottom wall 98 having a middle portion close to the top surface 60 and sloping downwardly and transversely away from the top surface 60 on each side before terminating to form an opening 95 on each side for fluid flow. Fluids, such as water and grease, flowing through drain holes 64 is captured by each baffle 96 and directed transversely outwardly to the opening 95 at each side. The fluid then falls by gravity downwardly through a grease path 99 (FIG. 2) formed on both sides of the removable product tray 66 between the tray and grease walls 45, thereby advantageously avoiding collection in tray 66 and contact with any food product.

Figure 3:
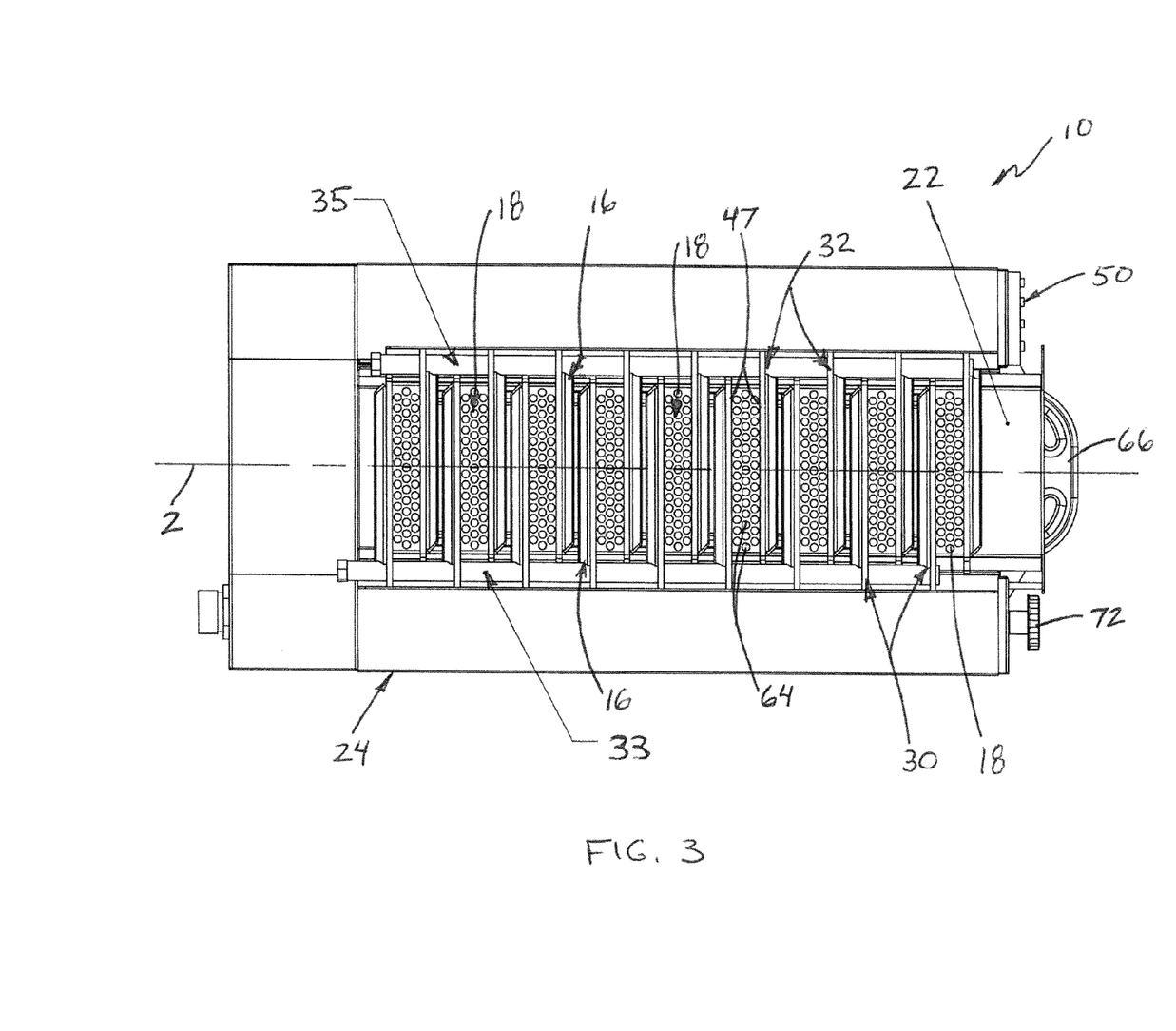
FIG. 3 is a top view of the device of FIG. 1 with the product door in the support position.
Figure 4:
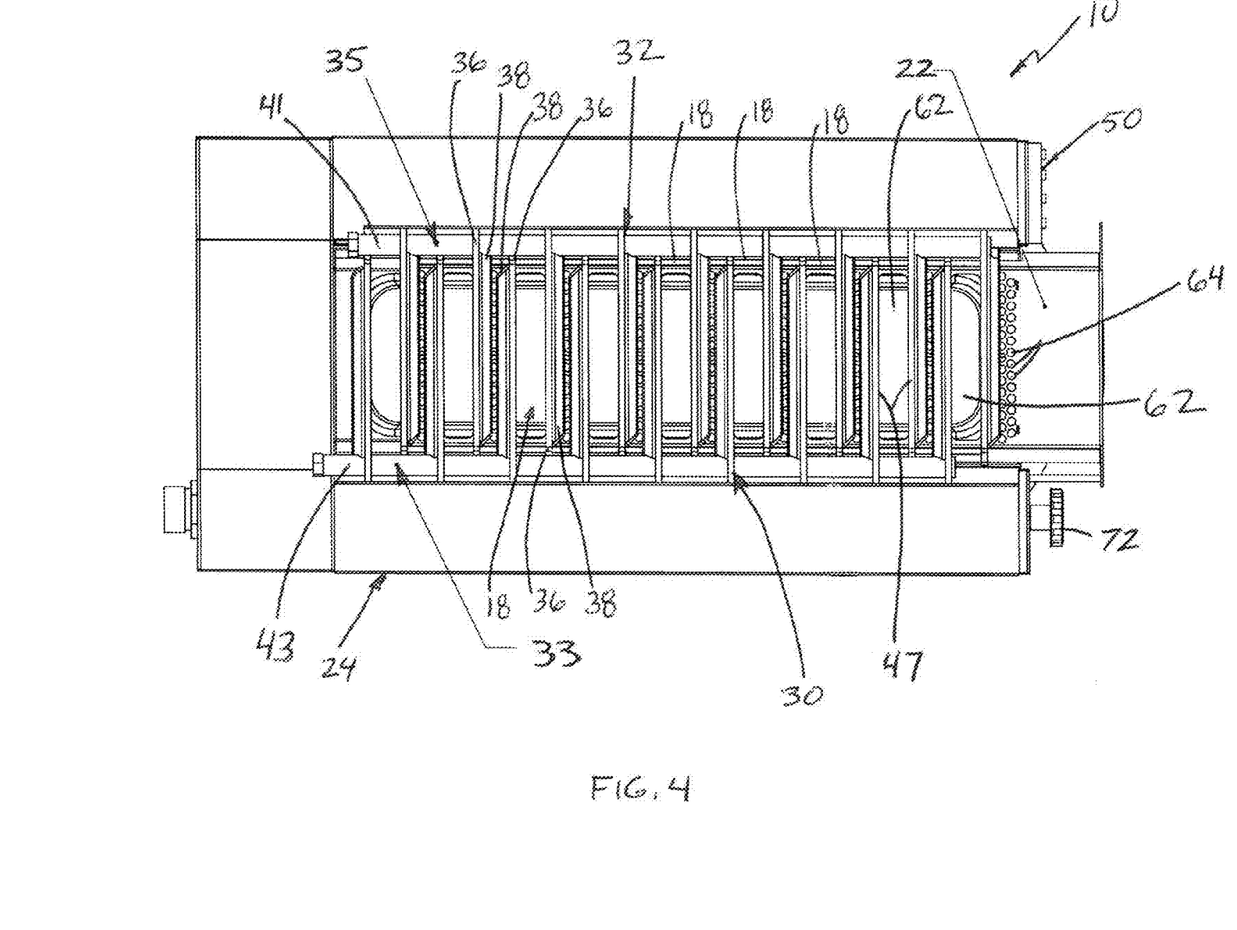
FIG. 4 is a top view of the device of FIG. 1 with the product door in the drop position.

As shown in FIG. 3, in the support position, with product door 22 pushed inwardly, drain holes 64 are aligned with slots 18 to allow product door 22 to support a food product during insertion and heating of the food product while permitting fluids, such as grease, to flow out of slots 18 to grease pan 65. In the support position, exit openings 62 are positioned out of alignment with slots 18 and directly under a heating element. As shown in FIG. 4, in the drop position, with product door 22 pulled outwardly, drain holes 64 are moved out of alignment with respective slots 18 and exit openings 62 are each positioned in alignment with slots 18 to cause the heated/cooked food product to fall by gravity onto a receiving tray 66 for removal by sliding tray 66 outwardly. In alternative embodiments, the product door may be either one door that pivots along an axis on one side of the assembly or two doors that pivot along respective axes extending along each side of the assembly. In lieu of manual operation, the unit may be provided with a linear actuator 85 connected to the product door 22 via a linkage 87 for automatic control of product door 22 based on a heating cycle of operation. Also, a removal assistance mechanism may be provided to place a force on the food product to aid in the removal of the food product from the slot.

Figure 5:
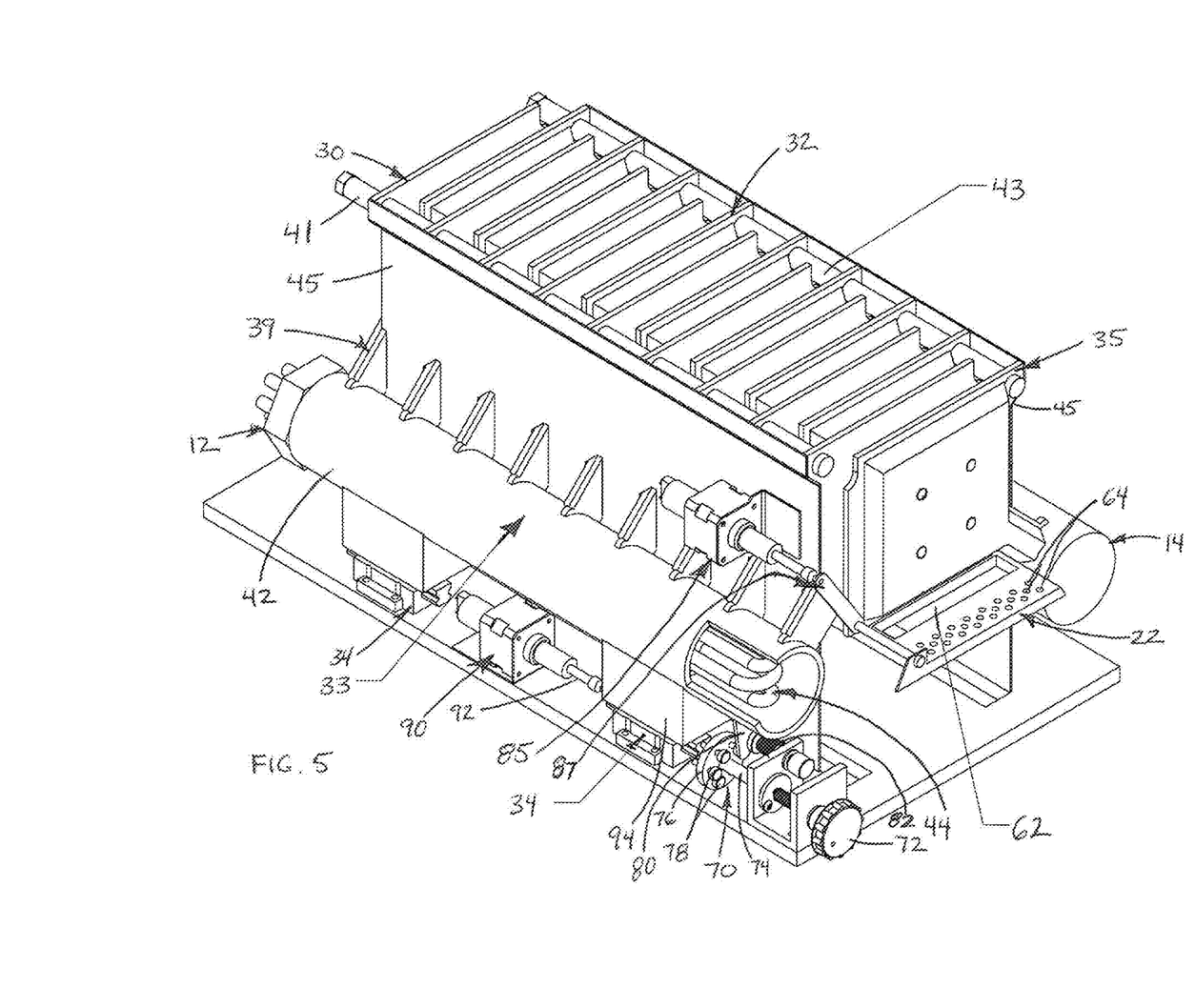
FIG. 5 is a perspective view of the device of FIG. 1 with the housing removed.

Referring to FIGS. 5 and 6, first heating assembly 33 may be mounted and arranged to be moved manually along linear bearings 34 by a user or, preferably, automatically moved by operation of a linear actuator 90, such as an electric motor and drive assembly, such as a screw type drive, or a solenoid actuator. In the exemplary embodiment, spring 82 is compressed when first heating assembly 33 is moved by an automatic actuator, i.e. linear actuator 34, away from the heating elements of the other heating assembly 35 into a loading position (to the right in FIG. 6). A shaft 92 of linear actuator 34 abuts a lower portion of a generator support 94. Then, upon deactivation of linear actuator 34, and reverse movement of the shaft 92 of linear actuator 34, first heating assembly 33 is moved back into the heating position against the food product by spring 82. Of course, more than one spring 82 may be used.

Electronic controls 50 may be provided for on/off control of heaters 44 together or independently, automatic operation of the linear actuator 90 to control axial movement of heating assembly 33, and automatic operation of product door 22, for example, by linear actuator 85. For example, all functions needed to complete a heating cycle may be preprogrammed in the electronic controls 50 and initiated by activation of a single button by a user.

During operation, the unit is turned on to cause heater 44 to begin heating the condensate. An indicator, such as a light, may be provided to indicate when the unit has reached a predetermined temperature and is ready for heating operation. A user may initiate the unit by activating a load button to cause the automatic controls 50 to move the first heating assembly 33 into the loading position and the product door to move into the support position. Food product is then placed in slots 18 and the cycle can continue by, for example, the user actuating another switch to initiate a heating cycle, such as selecting a preset heating or cook time. The cycle may include the linear/axial shifting or sliding movement of first heating assembly 33 toward second set of heating elements 32 to contact the food product, preferably on both sides. After a desired period of time determined by the user manually or by the preset automatic control, product door 22 is automatically moved into the drop position and then the first heating assembly 33 is moved linearly/axially away from second set of heating elements 32 and away from the food product allowing the food to drop by gravity onto receiving tray 66 for removal by a user.

Thus heating device 10 includes a series of heating elements oriented vertically and connected directly to a steam generating device(s). Half of the heating elements are connected together via the heat generator and are allowed to travel side to side as a group by way of linear bearings and a linear actuator device. Food product is loaded into the device from the top. The food is held in place by a sliding product door at the bottom and the traveling group of heating elements is moved into a heating position, thus allowing food product to be heated and/or cooked quickly on both sides. When heating and/or cooking is complete, the traveling group of heating elements is moved out of the heating position into a loading position, the sliding product door moved into a drop or open position, and the food product removed from the bottom of the unit.

In another exemplary embodiment of the invention, a heating device may be provided with only two opposing heating elements. In this case, the first heating element includes a heating surface extending transverse relative to the support surface while a second heating element includes a heating surface extending transverse relative to the support surface and positioned a spaced distance from the first heating element to create a heating slot sized to receive at least one food product. The first heating element is mounted to move linearly, along a longitudinal axis substantially perpendicular to the heating surfaces, and through the opening stroke away from the second heating element into the loading position and through the closing stroke toward the second heating element into the heating position.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A food heating device adapted to be positioned on a support surface to heat a food product, comprising:
at least one first heating element having a heating surface extending transverse relative to the support surface;
at least one second heating element having a heating surface extending transverse relative to the support surface and positioned a spaced distance from said at least one first heating element to create a heating slot sized to receive at least one food product; and
a product door movably mounted to move between a support position to support the food product in said heating slot and a drop position to permit the food product to drop from said heating slot,
wherein said at least one first heating element is mounted to move linearly, along a longitudinal axis substantially perpendicular to said heating surfaces, and through an opening stroke away from said at least one second heating element into a loading position and a closing stroke toward said at least one second heating element into a heating position.

2. The heating device of claim 1, wherein said at least one first heating element and said at least one second heating element are both adapted to contact the food product when said at least one first heating element is in said heating position.

3. The heating device of claim 1, further including a linear actuator adapted to move said at least one first heating element through said opening stroke.

4. The heating device of claim 3, further including at least one spring adapted to move said at least one first heating element through said closing stroke.

5. The heating device of claim 1, wherein said product door is slidably mounted for linear movement.

6. The heating device of claim 1, wherein said product door includes at least one drain hole to permit run-off liquid from the food product to flow through the product door when the product door is in said support position.

7. The heating device of claim 6, further including a receiving tray positioned below said product door to receive food product dropping from said heating slot, and a grease pan positioned below said receiving tray, said product door further including a liquid run-off baffle positioned below said at least one drain hole to direct liquid run-off from the food product to said grease pan while avoiding said receiving tray.

8. The heating device of claim 1, further including an adjustable stop to adjust a position of said at least one first heating element in said heating position to controllably define a width of said heating slot.

9. A food heating device adapted to heat multiple food products simultaneously, comprising:
first and second supports;
a first set of heating elements connected to the first support and positioned along a longitudinal axis, each of the first set of heating elements having a heating surface positioned transverse to the longitudinal axis; and a second set of heating elements connected to the second support and free from support from the first support and positioned along the longitudinal axis, each of the second set of heating elements having a heating surface positioned transverse to the longitudinal axis, the second set of heating elements positioned in an alternating arrangement with said first set of heating elements, wherein at least two of said first set of heating elements are each positioned adjacent to two of the said second set of heating elements to form multiple heating slots, wherein said first set of heating elements is movably mounted to move through an opening stroke into a loading position enlarging a size of said heating slot and to move through a closing stroke into a heating position reducing the side of said heating slot.

10. The heating device of claim 9, further including a linear actuator adapted to move said first set of heating elements and the first support linearly along said longitudinal axis through said opening stroke.

11. The heating device of claim 10, further including at least one spring adapted to move said first set of heating elements and the first support through said closing stroke.

12. The heating device of claim 9, further including at least one heat generator adapted to supply heat to said first and said second sets of heating elements.

13. The heating device of claim 10, wherein said at least one heat generator includes a first heat generator mounted on a first side of the food heating device to provide heat to said first set of heating elements and a second heat generator mounted on a second side of the food heating device to provide heat to said second set of heating elements.

14. The heating device of claim 13, wherein said first and said second heat generators are steam generators, each heating element of said first and said second sets of heating elements including an inner chamber fluidly connected to said first and said second heat generators, respectively.

15. The heating device of claim 12, wherein said first set of heating elements and said at least one heat generator are mounted for linear movement along said longitudinal axis during said opening and closing strokes.

16. The heating device of claim 14, further including a first manifold fluidly connected to each of the inner chambers of said first set of heating elements, and a second manifold fluidly connected to each of the inner chambers of said second set of heating elements, to permit fluid flow between the inner chambers the heating elements within each of said first and said second sets of heating elements.

* * * * *